(12) United States Patent
Wang et al.

(10) Patent No.: US 11,743,090 B2
(45) Date of Patent: Aug. 29, 2023

(54) METHOD AND APPARATUS FOR CARRIER FREQUENCY-OFFSET DETERMINATION AND STORAGE MEDIUM

(71) Applicant: RDA MICROELECTRONICS (SHANGHAI) CO., LTD., Shanghai (CN)

(72) Inventors: Fengxiang Wang, Shanghai (CN); Jiayi Zhuang, Shanghai (CN); Liyun Luo, Shanghai (CN); Yongqian Wang, Shanghai (CN); Jian Cheng, Shanghai (CN); Kai Li, Shanghai (CN)

(73) Assignee: RDA MICROELECTRONICS (SHANGHAI) CO., LTD., Shanghai (CN)

( * ) Notice: Subject to any disclaimer, the term of this patent is extended or adjusted under 35 U.S.C. 154(b) by 32 days.

(21) Appl. No.: 17/572,845

(22) Filed: Jan. 11, 2022

(65) Prior Publication Data

US 2022/0150101 A1     May 12, 2022

Related U.S. Application Data

(63) Continuation of application No. PCT/CN2020/093479, filed on May 29, 2020.

(30) Foreign Application Priority Data

Jul. 18, 2019   (CN) .......................... 201910649973.0

(51) Int. Cl.
*H04L 7/06*      (2006.01)
*H04L 27/26*     (2006.01)
(Continued)

(52) U.S. Cl.
CPC ........ *H04L 27/2657* (2013.01); *H04L 7/0016* (2013.01); *H04L 7/06* (2013.01); *H04W 56/0035* (2013.01)

(58) Field of Classification Search
CPC .................................................. H04W 56/0035
(Continued)

(56) References Cited

U.S. PATENT DOCUMENTS

| | | | |
|---|---|---|---|
| 2013/0149974 A1* | 6/2013 | Lorenz | G01S 19/23 |
| | | | 455/75 |
| 2015/0156036 A1* | 6/2015 | Genossar | H04L 25/03038 |
| | | | 375/232 |

(Continued)

FOREIGN PATENT DOCUMENTS

| | | | |
|---|---|---|---|
| CN | 1543102 A | 11/2004 | |
| CN | 1756411 A | 4/2006 | |

(Continued)

OTHER PUBLICATIONS

The International Search Report issued in corresponding International Application No. PCT/CN2020/093479, dated Aug. 19, 2020.

(Continued)

*Primary Examiner* — Qutbuddin Ghulamali
(74) *Attorney, Agent, or Firm* — Dave Law Group LLC; Raj S. Dave

(57) ABSTRACT

A method and an apparatus for carrier frequency-offset determination and a storage medium are provided. The method includes the following. A first carrier initial frequency-offset is obtained according to a pilot time interval and a pilot phase difference of a first carrier. A second carrier frequency-offset is obtained according to a carrier frequency-ratio of a second carrier to the first carrier and the first carrier initial frequency-offset. A first carrier frequency-offset is obtained according to the first carrier initial frequency-offset.

20 Claims, 10 Drawing Sheets

(51) Int. Cl.
  *H04L 7/00* (2006.01)
  *H04W 56/00* (2009.01)

(58) Field of Classification Search
  USPC .................................................. 375/344, 346
  See application file for complete search history.

(56) References Cited

U.S. PATENT DOCUMENTS

2016/0211953 A1* 7/2016 Ezaki ................... H04L 27/0014
2017/0214552 A1* 7/2017 Wei .......................... H04L 27/26
2018/0323901 A1* 11/2018 Seok ..................... H04L 1/0031

FOREIGN PATENT DOCUMENTS

| CN | 1937607 A   | 3/2007  |
| CN | 101553028 A | 10/2009 |
| CN | 102932808 A | 2/2013  |
| CN | 105337909 A | 2/2016  |
| CN | 106911600 A | 6/2017  |
| CN | 107305223 A | 10/2017 |
| CN | 107623650 A | 1/2018  |
| CN | 108881085 A | 11/2018 |
| CN | 110311874 A | 10/2019 |

OTHER PUBLICATIONS

The First Office Action issued in corresponding CN Application No. CN201910649973.0, dated Mar. 11, 2021.
ZTE :"Frequency and Channel Raster Issue NR", <<3GPP TSG RAN WG1 Meeting #86bis R1-1608967>>, pp. 1-5, Oct. 1, 2016 (Oct. 1, 2016).
Ming Zhou et al. "A Phase Difference Based Frequency Offset Estimation Algorithm", <<2008 Annual Conference on Communication Theory and Signal Processing>>, pp. 544-550, Mar. 23, 2009 (Mar. 23, 2009).
The Second Office Action issued in corresponding CN Application No. CN201910649973.0, dated Sep. 22, 2021.

* cited by examiner

US 11,743,090 B2

METHOD AND APPARATUS FOR CARRIER FREQUENCY-OFFSET DETERMINATION AND STORAGE MEDIUM

CROSS-REFERENCE TO RELATED APPLICATION(S)

This application is a continuation of International Application No. PCT/CN2020/093479, filed on May 29, 2020, which claims priority to Chinese Patent Application No. 201910649973.0, filed on Jul. 18, 2019, the disclosures of which are hereby incorporated by reference in their entireties.

TECHNICAL FIELD

The present disclosure relates to the technology field of communication, and in particular to a method and an apparatus for carrier frequency-offset determination and a storage medium.

BACKGROUND

An orthogonal frequency division multiplexing (OFDM) system is very sensitive to a carrier frequency-offset (CFO). Therefore, a good frequency-offset estimation/correction technology is important for guaranteeing the performance of a long-term evolution (LTE)/$5^{th}$ generation (5G) system. The frequency-offset estimation is generally based on a phase difference, and the phase is periodic. In the case of a large frequency-offset, the phase difference has an ambiguity of $2\pi$, so the corresponding frequency-offset also has an interval ambiguity. Such ambiguities will lead to inaccuracy of the frequency-offset obtained. In the related art, a cyclic prefix (CP), a physical uplink control channel (PUCCH)/sounding reference signal (SRS), and construction of a special pilot structure are usually used to remove the interval ambiguity of the frequency-offset and determine the frequency-offset. However, a method for frequency-offset determination adopted in the related art is relatively complicated, not well versatility, and requires more resources, which causes additional overhead.

SUMMARY

According to a first aspect of the present disclosure, a method for carrier frequency-offset determination is provided. The method includes the following. A first carrier initial frequency-offset is obtained according to a pilot time interval and a pilot phase difference of a first carrier. A second carrier frequency-offset is obtained according to a carrier frequency-ratio of a second carrier to the first carrier and the first carrier initial frequency-offset. A first carrier frequency-offset is obtained according to the first carrier initial frequency-offset.

According to a second aspect of the present disclosure, an apparatus for carrier frequency-offset determination is provided. The apparatus includes a memory and a processor. The memory is configured to store processor executable instructions. The processor is configured to obtain a first carrier initial frequency-offset according to a pilot time interval and a pilot phase difference of a first carrier, obtain a second carrier frequency-offset according to a carrier frequency-ratio of a second carrier to the first carrier and the first carrier initial frequency-offset, and obtain a first carrier frequency-offset according to the first carrier initial frequency-offset.

According to a third aspect of the present disclosure, a non-volatile computer-readable storage medium is provided. The non-volatile computer-readable storage medium stores computer program instructions. The computer program instructions are operable with a processor to obtain a first carrier initial frequency-offset according to a pilot time interval and a pilot phase difference of a first carrier, obtain a second carrier frequency-offset according to a carrier frequency-ratio of a second carrier to the first carrier and the first carrier initial frequency-offset, and obtain a first carrier frequency-offset according to the first carrier initial frequency-offset.

BRIEF DESCRIPTION OF THE DRAWINGS

The drawings included in the specification and constituting a part of the specification together with the specification illustrate exemplary embodiments, features, and aspects of the present disclosure, and are used to explain the principle of the present disclosure.

DETAILED DESCRIPTION

Figure 1:
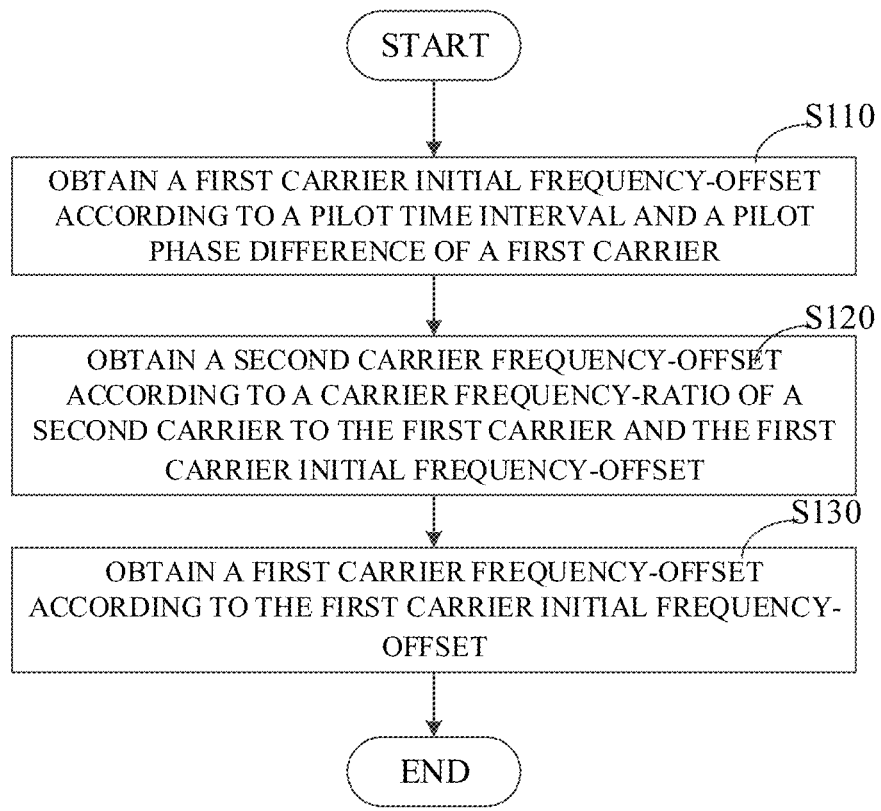
FIG. 1 is a flowchart illustrating a method for carrier frequency-offset determination according to an implementation of the present disclosure.

Hereinafter, various exemplary embodiments, features, and aspects of the present disclosure will be described in detail with reference to the drawings. The same reference numbers in the drawings indicate elements with the same or similar functions. Although various aspects of embodiments are illustrated in the drawings, unless otherwise noted, the drawings are not necessarily drawn to scale.

A specific word "exemplary" here means "serving as an example, embodiment, or illustration". Any embodiment described herein as "exemplary" need not be construed as being preferred to or better than other embodiments.

In addition, to better illustrate the present disclosure, numerous specific details are given in the following detailed description. Those skilled in the art should understand that the present disclosure can also be implemented without certain specific details. In some instances, to highlight the subject matter of the present disclosure, methods, means, elements, and circuits well known to those skilled in the art have not been described in detail.

In the related art, a basic scheme for estimating a frequency-offset (including a frequency-offset caused by a crystal oscillator or Doppler effect) is to convert the frequency-offset based on a phase rotation in time domain. However, the phase is periodic, and a direct calculation of a phase difference can only get a value within a range of $[-\pi, \pi)$. If the phase rotation goes beyond this range, there will be an ambiguity of an integer number of $2\pi$. For example, on a high-speed railway, due to a high moving speed of a user and a large frequency-offset, the phase rotation is likely to go beyond the range of $[-\pi, \pi)$. Therefore, the frequency-offset directly estimated based on the phase difference corresponds to different possible frequency-offset values, so in the related art, it is difficult to determine a true value of the frequency-offset.

Referring to FIG. 1, FIG. 1 is a flowchart illustrating a method for carrier frequency-offset determination according to an implementation of the present disclosure.

The method is performed by a terminal device. The terminal device is also referred to as user equipment (UE), a mobile station (MS), a mobile terminal (MT), and the like, and is a device that provides a user with voice and/or data connectivity, such as a handheld device, a vehicle-mounted device with wireless connectivity capabilities, and the like. At present, some examples of the terminal device include: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self-driving, a wireless terminal in remote medical surgery, and a wireless terminal in smart grid, a wireless terminal in transportation safety, a wireless terminal in smart city, a wireless terminal in smart home, a wireless terminal in internet of vehicles, etc.

As illustrated in FIG. 1, the method includes the following.

At S110, a first carrier initial frequency-offset is obtained according to a pilot time interval and a pilot phase difference of a first carrier.

At S120, a second carrier frequency-offset is obtained according to a carrier frequency-ratio of a second carrier to the first carrier and the first carrier initial frequency-offset.

At S130, a first carrier frequency-offset is obtained according to the first carrier initial frequency-offset.

In the present disclosure, the first carrier initial frequency-offset is obtained according to the pilot time interval and the pilot phase difference of the first carrier, the second carrier frequency-offset is obtained according to the carrier frequency-ratio of the second carrier to the first carrier and the first carrier initial frequency-offset, and the first carrier frequency-offset is obtained according to the first carrier initial frequency-offset. The method for carrier frequency-offset determination provided in the present disclosure is simple and efficient. Channel resources, computing resources, and overhead can be saved with this method. In addition, an accurate carrier frequency-offset can be quickly obtained while improving communication efficiency, thereby improving accuracy, reliability, and versatility of communication.

The technical solution proposed in the present disclosure has a wide application range. For example, when two carrier frequencies are emitted by a same terminal device, generated by a same crystal oscillator, or generated by two different crystals with a small frequency-deviation (such as 0.1 ppm) therebetween, the method for carrier frequency-offset determination proposed in the present disclosure is applicable. The method for carrier frequency-offset determination described in the present disclosure can be used to determine a frequency-offset caused by Doppler effect or a frequency-offset caused by a crystal oscillator.

The method for carrier frequency-offset determination proposed in the present disclosure is applicable to a variety of communication systems, for example, a communication system adopting the discontinuous carrier aggregation (CA) technology. For example, the present disclosure is applicable to an orthogonal frequency division multiplexing (OFDM) system adopting the CA technology.

Figure 2A:
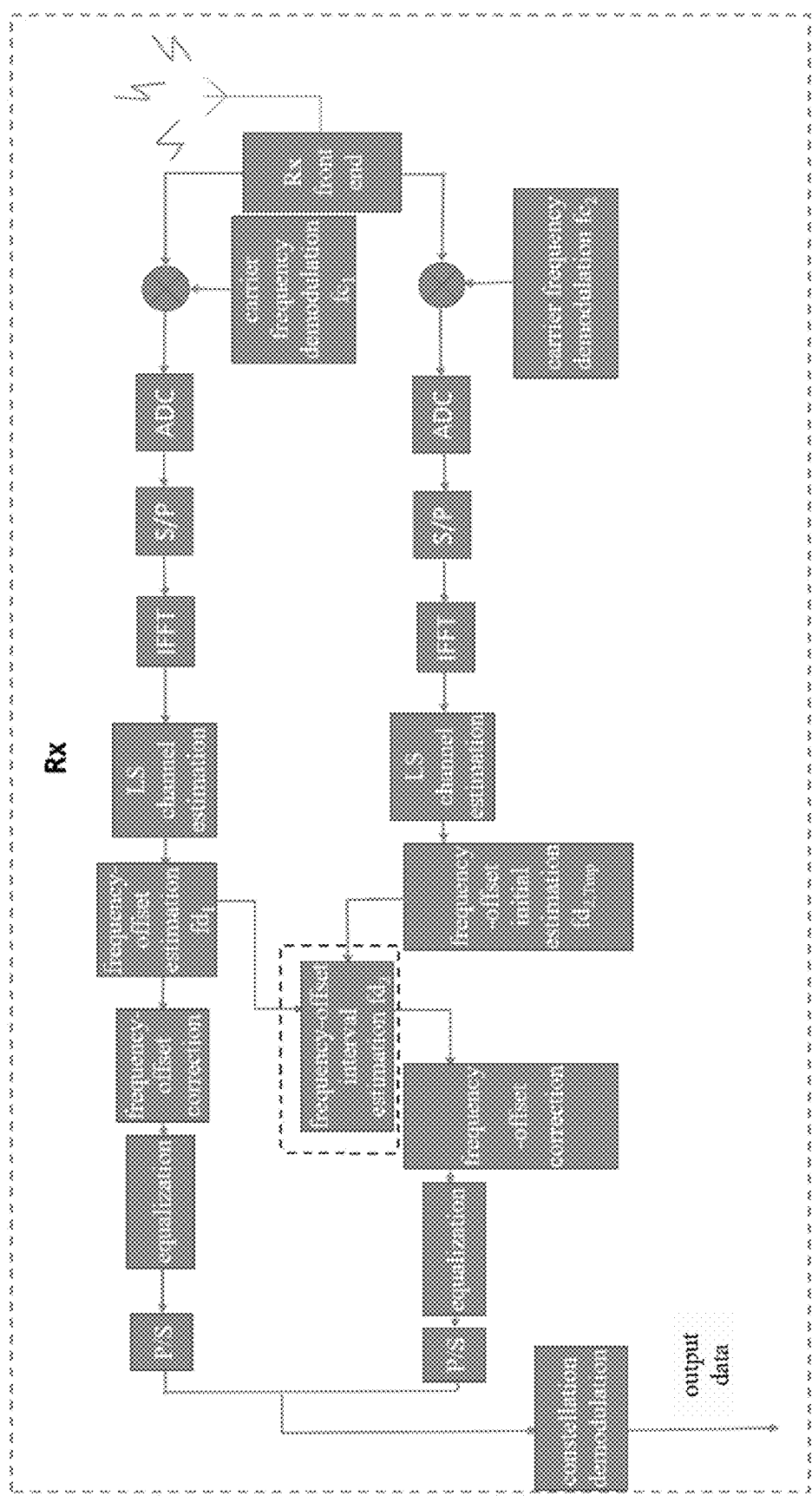
FIGS. 2A and 2B are schematic diagrams illustrating a receiving part in an orthogonal frequency division multiplexing (OFDM) system.
Figure 2B:
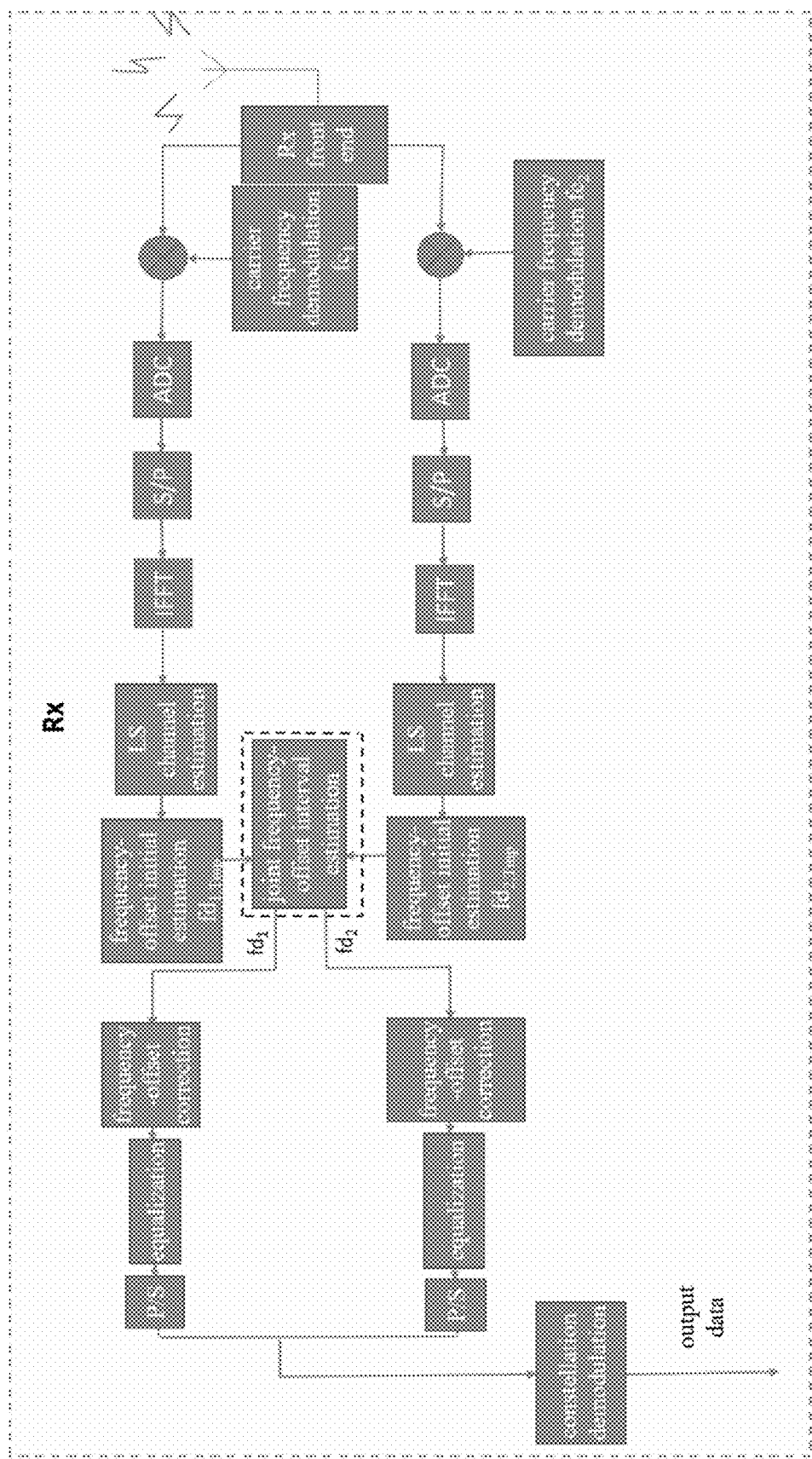

Referring to FIGS. 2A and 2B, FIGS. 2A and 2B are schematic diagrams illustrating a receiving part in an OFDM system.

As illustrated in FIGS. 2A and 2B, taking the OFDM system as an example, when a receiver receives a radio frequency (RF) signal, the following will be performed in sequence on the RF signal: carrier frequency demodulation, analog to digital conversion (ADC), serial to parallel (S/P) conversion, inverse fast fourier transform (IFFT), least square (LS) channel estimation, frequency-offset estimation, frequency-offset correction, equalization processing, parallel to serial (P/S) conversion, constellation demodulation, and then data is output.

The technical solution of the present disclosure is used in frequency-offset estimation. For different relationships between carrier frequencies of two signals, for example, a first carrier and a second carrier, there may be different methods for frequency-offset determination. For example, after estimation of a first carrier frequency-offset $fd_1$, a second carrier frequency-offset $fd_2$ can be obtained based on the first carrier frequency-offset $fd_1$ and frequency-offset interval estimation (as illustrated in FIG. 2A). Alternatively, after initial estimation of the first carrier frequency-offset and the second carrier frequency-offset, joint frequency-offset interval estimation is performed to obtain the first carrier frequency-offset and the second carrier frequency-offset (as illustrated in FIG. 2B).

In a possible implementation, the carrier frequency of the second carrier may be greater than the carrier frequency of the first carrier.

The methods for frequency-offset determination illustrated in FIGS. 2A and 2B will be separately described below.

The method illustrated in FIG. 2A is as follows.

In a possible implementation, the carrier frequency of the first carrier may be in megahertz (MHz) level (less than 1 gigahertz (GHz)), and the carrier frequency of the second carrier may be in GHz level (greater than 1 GHz).

In a possible implementation, the first carrier initial frequency-offset may be determined based on the following formula:

$$fd_1 = \frac{\Delta \varphi_1}{2\pi * \Delta T1},$$

where $fd_1$ represents the first carrier initial frequency-offset, $\Delta \varphi_1$ represents the pilot phase difference of the first carrier, and $\Delta T1$ represents the pilot time interval of the first carrier.

In a possible implementation, the first carrier frequency-offset is obtained at S130 according to the first carrier initial frequency-offset as follows.

The first carrier initial frequency-offset is assigned as the first carrier frequency-offset.

When the carrier frequency of the first carrier is less than 1 GHz, the pilot phase difference or rotation of the first carrier is within $[-\pi, \pi)$ and will generally not go beyond a range of $2\pi$. Therefore, a unique first carrier initial frequency-offset $fd_1$ can be obtained based on the above formula, and the first carrier initial frequency-offset $fd_1$ is directly assigned as the first carrier frequency-offset, which is equivalent to frequency-offset estimation $fd_1$ in FIG. 2A.

In a possible implementation, the second carrier frequency-offset is obtained according to the carrier frequency-ratio of the second carrier to the first carrier and the first carrier initial frequency-offset as follow.

A product of the carrier frequency-ratio and the first carrier initial frequency-offset is assigned as the second carrier frequency-offset.

Figure 3:
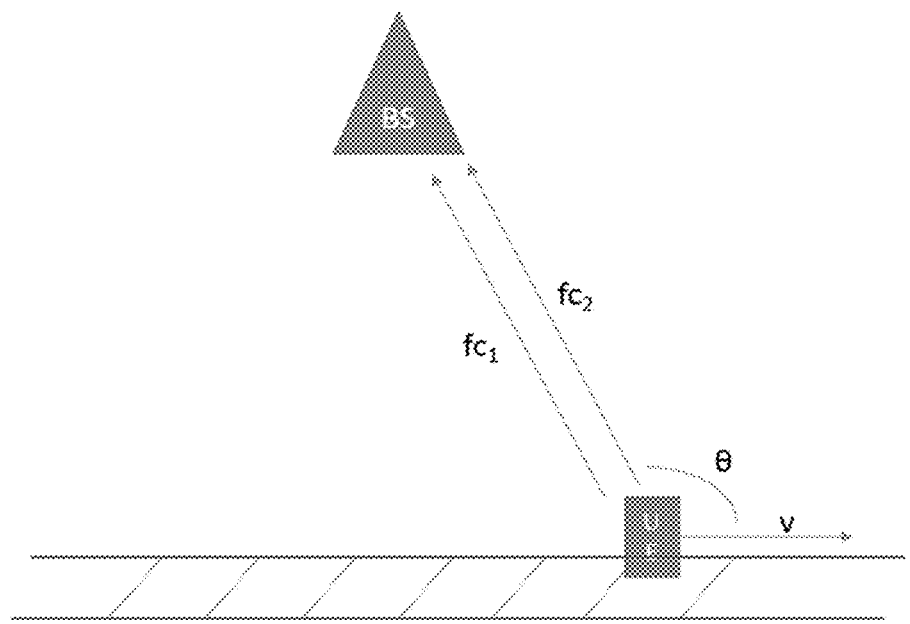
FIG. 3 is a diagram illustrating an application scenario of a method for carrier frequency-offset determination according to an implementation of the present disclosure.

Referring to FIG. 3, FIG. 3 is a diagram illustrating an application scenario of a method for carrier frequency-offset determination according to an implementation of the present disclosure.

As illustrated in FIG. 3, a frequency-offset caused by Doppler effect is determined by carrier frequencies (i.e., a first carrier frequency $fc_1$ and a second carrier frequency $fc_2$), a movement speed v, and an angle θ between a movement direction and a signal transmission direction. For two carrier frequencies of a same user equipment (UE), one carrier frequency has a same movement speed v and angle θ as the other carrier frequency. Therefore, for the two carrier frequencies, a frequency-offset ratio is equal to a carrier frequency-ratio.

That is, $fd_2/fd_1=fc_2/fc_1$, where $fd_2$ represents a second carrier frequency-offset, and $fd_1$ represents a first carrier frequency-offset.

Then, $fd_2=fc_2/fc_1*fd_1$, that is, the second carrier frequency-offset is equal to the product of the carrier frequency-ratio and the first carrier initial frequency-offset.

According to the present disclosure, by assigning the product of the carrier frequency-ratio and the first carrier initial frequency-offset as the second carrier frequency-offset, the second carrier frequency-offset can be quickly and easily obtained.

Of course, when the carrier frequency-offset of the second carrier is greater than 1 GHz, for example, is 2.6 GHz, a pilot phase difference or rotation of the second carrier is likely to go beyond a range of 2π. Therefore, in the present disclosure, the second carrier frequency-offset can also be obtained according to the following method.

In a possible implementation, the second carrier frequency-offset can be obtained at S120 according to the carrier frequency-ratio of the second carrier to the first carrier and the first carrier initial frequency-offset as follows.

Multiple third frequency-offsets are obtained according to a pilot time interval and a pilot phase difference of the second carrier. One of the multiple third frequency-offsets is determined as the second carrier frequency-offset according to the carrier frequency-ratio.

A frequency-offset interval of the second carrier in FIG. 2A includes the multiple third frequency-offsets.

In a possible implementation, the multiple third frequency-offsets may be determined based on the following formula:

$$fd_2 = \frac{\Delta\varphi_2 + 2\pi*n}{2\pi*\Delta T2},$$

where $fd_2$ represents the third frequency-offset, $\Delta\varphi_2$ represents the pilot phase difference of the second carrier frequency, and ΔT2 represents the pilot time interval of the second carrier frequency, n is an integer.

In a possible implementation, a preset range of the frequency-offset can be estimated in advance according to a carrier frequency, a movement speed, a crystal oscillator offset, etc., and the multiple third frequency-offsets can be obtained according to the preset range.

In this way, according to the present disclosure, calculation amount in calculating the multiple third frequency-offsets can be reduced, thereby saving calculation resources.

In a possible implementation, one of the multiple third frequency-offsets can be determined as the second carrier frequency-offset according to the carrier frequency-ratio as follows.

One of the multiple third frequency-offsets, which is closest to the product of the carrier frequency-ratio and the first carrier initial frequency-offset, is determined as the second carrier frequency-offset.

With the above method, according to the present disclosure, the second carrier frequency-offset can be determined from the multiple third frequency-offsets to obtain an accurate frequency-offset value. In addition, the method is simple and occupies less channel resources and computing resources, thereby improving communication efficiency.

When the carrier frequency of the first carrier and the carrier frequency of the second carrier are both greater than 1 GHz, for example, the carrier frequency of the first carrier is 1.8 GHz and the carrier frequency of the second carrier is 2.6 GHz, the pilot phase difference or rotation of the first carrier is also likely to go beyond a range of a 2π (for the situation in FIG. 2B). Therefore, the following describes carrier frequency-offset determination via joint frequency-offset interval estimation in FIG. 2B.

In a possible implementation, the first carrier initial frequency-offset may be determined based on the following formula:

$$fd_1 = \frac{\Delta\varphi_1 + 2\pi*k}{2\pi*\Delta T1},$$

where k represents an integer.

It can be seen that, in this case, the first carrier initial frequency-offset may include multiple first carrier initial frequency-offsets, that is, the frequency-offset interval of the first carrier includes multiple first carrier initial frequency-offsets.

In a possible implementation, a preset range of the first carrier frequency-offset can be estimated in advance according to a carrier frequency, a movement speed, a crystal oscillator offset, etc., and multiple first carrier initial frequency-offsets can be selected according to the preset range, to finally obtain the first carrier frequency-offset.

It should be noted that, the first carrier frequency-offset and the second carrier frequency-offset are determined by combining the multiple first carrier initial frequency-offsets (the frequency-offset interval of the first carrier) and the multiple third frequency-offsets (the frequency-offset interval of the second carrier). In this way, the first carrier frequency-offset and the second carrier frequency-offset are determined via joint frequency-offset interval estimation in FIG. 2B.

In a possible implementation, the method may further include the following.

Multiple frequency-offset ratios of the multiple third frequency-offsets to the multiple first carrier initial frequency-offsets are obtained.

The second carrier frequency-offset is obtained according to the multiple frequency-offset ratios and the carrier frequency-ratio.

The multiple frequency-offset ratios can be obtained by comparing each third frequency-offset to each first carrier initial frequency-offset. For example, if there are N third frequency-offsets and M first carrier initial frequency-offsets, then each third frequency-offset may be compared to each first carrier initial frequency-offset to obtain N×M frequency-offset ratios. In the present disclosure, the first carrier frequency-offset and the second carrier frequency-offset can be obtained based on the multiple frequency-offset ratios and the carrier frequency-ratio.

In a possible implementation, the second carrier frequency-offset may be obtained according to the frequency-offset ratios and the carrier frequency-ratio as follows.

A frequency-offset ratio closest to the carrier frequency-ratio is determined. For example, a frequency-offset ratio closest to the carrier frequency-ratio is determined from the above N×M frequency-offset ratios.

A third frequency-offset, which corresponds to the frequency-offset ratio closest to the carrier frequency-ratio, is determined as the second carrier frequency-offset.

In a possible implementation, the first carrier frequency-offset is obtained according to the first carrier initial frequency-offset as follows.

A first carrier initial frequency-offset, which corresponds to the frequency-offset ratio closest to the carrier frequency-ratio, is assigned as the first carrier frequency-offset.

With the above method, according to the present disclosure, the first carrier frequency-offset and the second carrier frequency-offset can be quickly and simply obtained when the carrier frequency of the first carrier and the carrier frequency of the second carrier are both greater than 1 GHz. By using the carrier frequency-ratio to determine the frequency-offset, influence of the phase differences or rotations of the first carrier and the second carrier by more than $2\pi$ can be removed, thereby obtaining an accurate frequency-offset estimation.

In the carrier frequency-offset caused by Doppler effect and/or a crystal oscillator, the ratio of the carrier frequency of the first carrier to the carrier frequency of the second carrier is equal or similar to the ratio of the first carrier frequency-offset to the second carrier frequency-offset. In the present disclosure, the first carrier frequency-offset and the second carrier frequency-offset can be obtained simply and conveniently with this feature. The first carrier frequency-offset and the second carrier frequency-offset obtained with the method for carrier frequency-offset determination of the present disclosure are accurate.

In an OFDM system or other systems using the CA technology, an accurate signal can be obtained by performing frequency-offset correction based on the first carrier frequency-offset and the second carrier frequency-offset obtained with the method for carrier frequency-offset determination of the present disclosure, thereby ensuring reliability and accuracy of communication. In addition, compared with a method for frequency-offset determination in the related art, the method of the present disclosure is simpler and of low complexity, thereby significantly saving computing resources and channel resources and improving resource utilization.

Referring to FIGS. 4A-4C, 5A-5C, and 6A-6C, FIGS. 4A-4C, 5A-5C, and 6A-6C are diagrams illustrating comparison between a cumulative distribution function (CDF) of a frequency-offset obtained through a method for carrier frequency-offset determination of the present disclosure and a true value of the frequency-offset.

The comparison diagrams illustrated in FIGS. 4A-4C, 5A-5C, and 6A-6C are statistical diagrams obtained from a large number of carrier frequency-offsets determined with the method for carrier frequency-offset determination of the present disclosure.

During a test, a selected LTE configuration may include: a subcarrier spacing of 15 kHz, an FFT size of 2048, a number of CP points of 144, a time interval between two pilots of 0.5 ms, and 10000 time slots. The carrier frequency of the second carrier is 2.6 GHz, and the carrier frequency of the first carrier is 900 MHz.

Figure 4A:
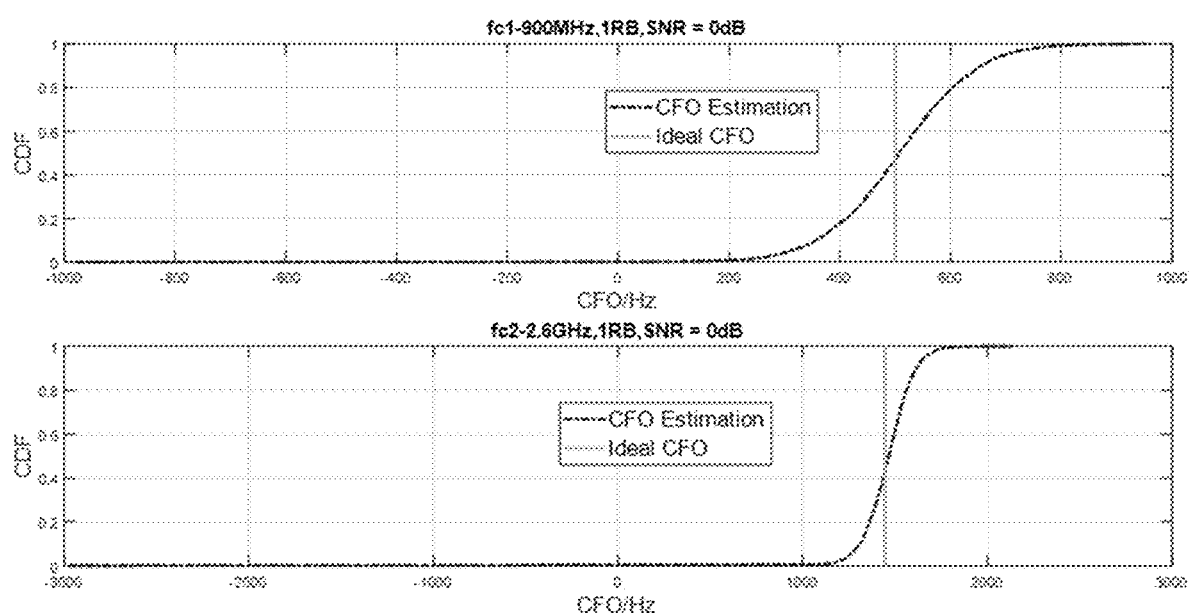
FIGS. 4A-4C, 5A-5C, and 6A-6C are diagrams illustrating comparison between a cumulative distribution function (CDF) of a frequency-offset obtained through a method for carrier frequency-offset determination of the present disclosure and a true value of the frequency-offset.
Figure 4B:
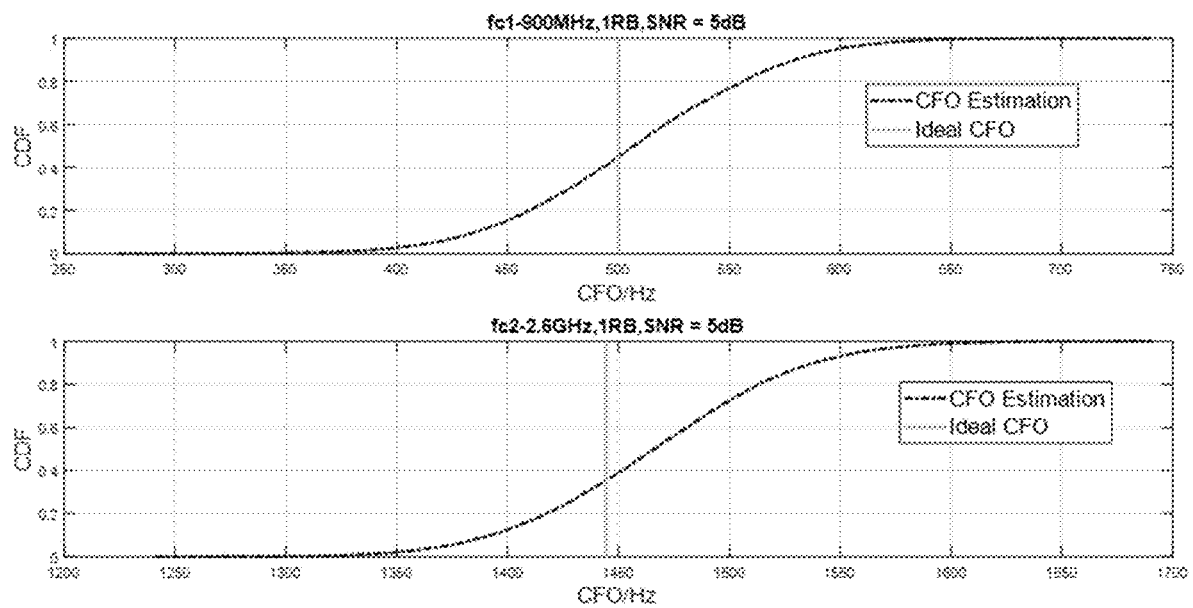
Figure 4C:
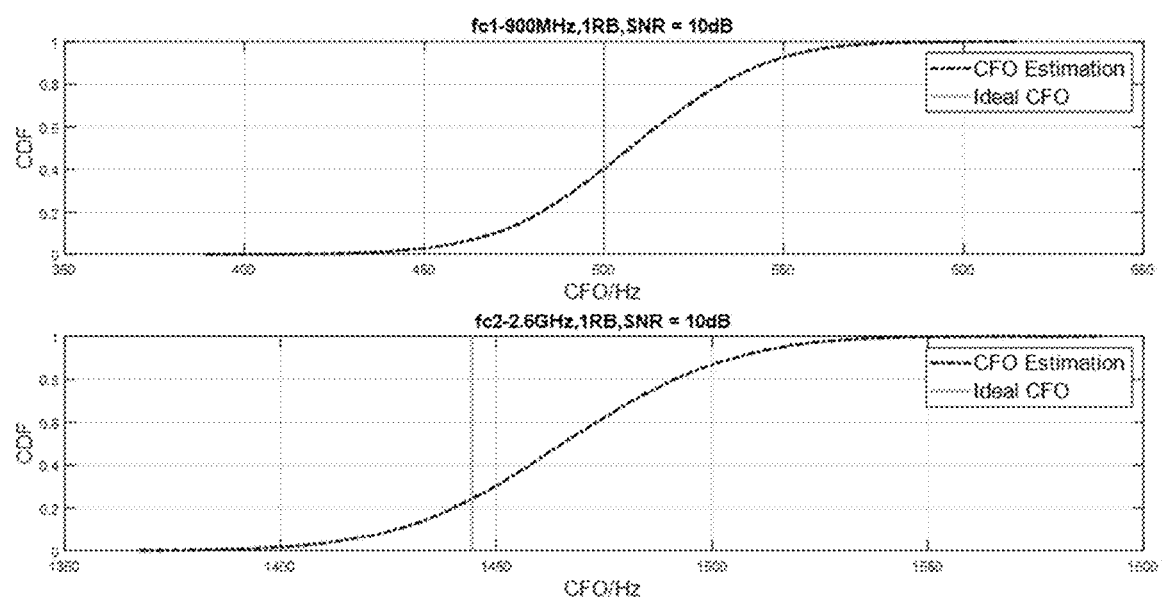

FIGS. 4A-4C illustrate a test result obtained by using 1 resource block (RB) for testing, and signal-to-noise ratios (SNR) of FIGS. 4A-4C are 0 dB, 5 dB, and 10 dB in sequence.

Figure 5A:
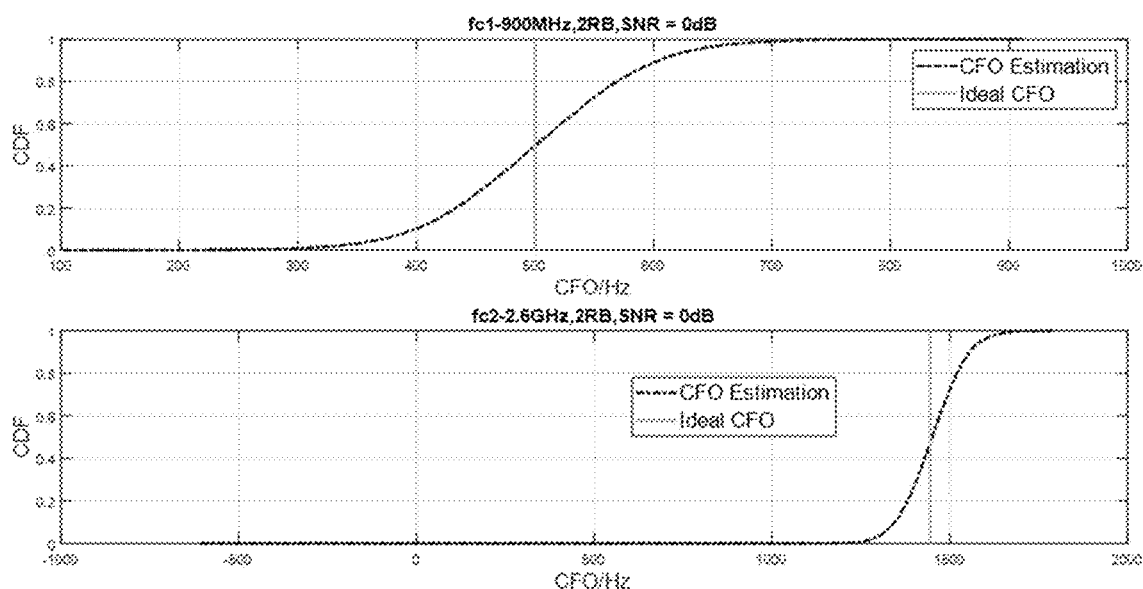
Figure 5B:
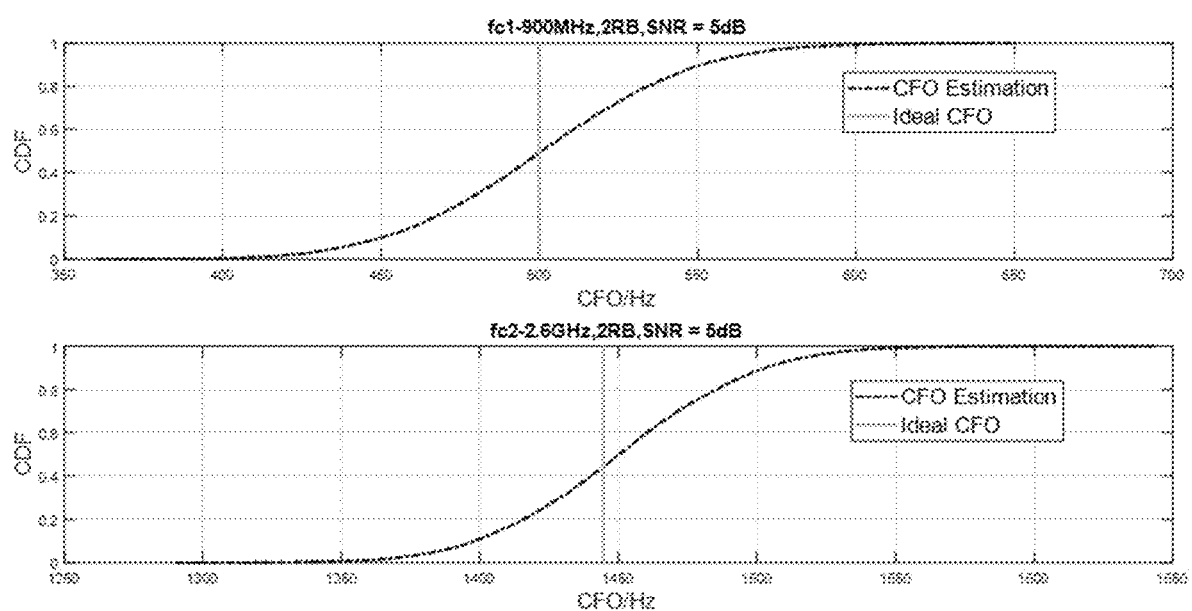
Figure 5C:
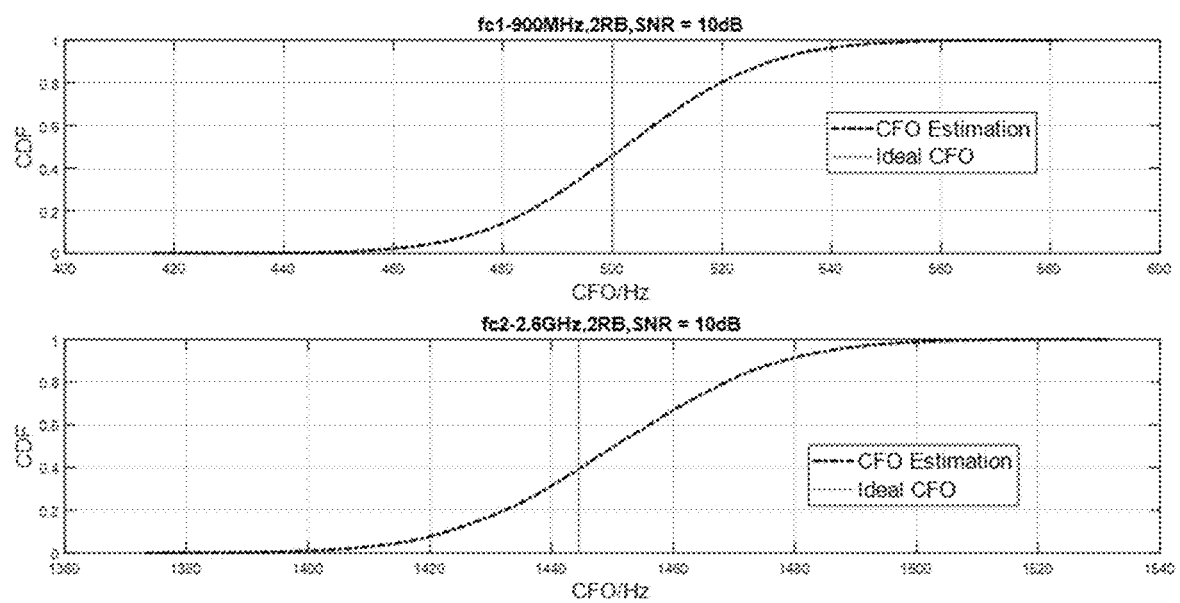

FIGS. 5A-5C illustrate a test result obtained by using 2RB for testing, and SNRs of FIGS. 5A-5C are 0 dB, 5 dB, and 10 dB in sequence.

Figure 6A:
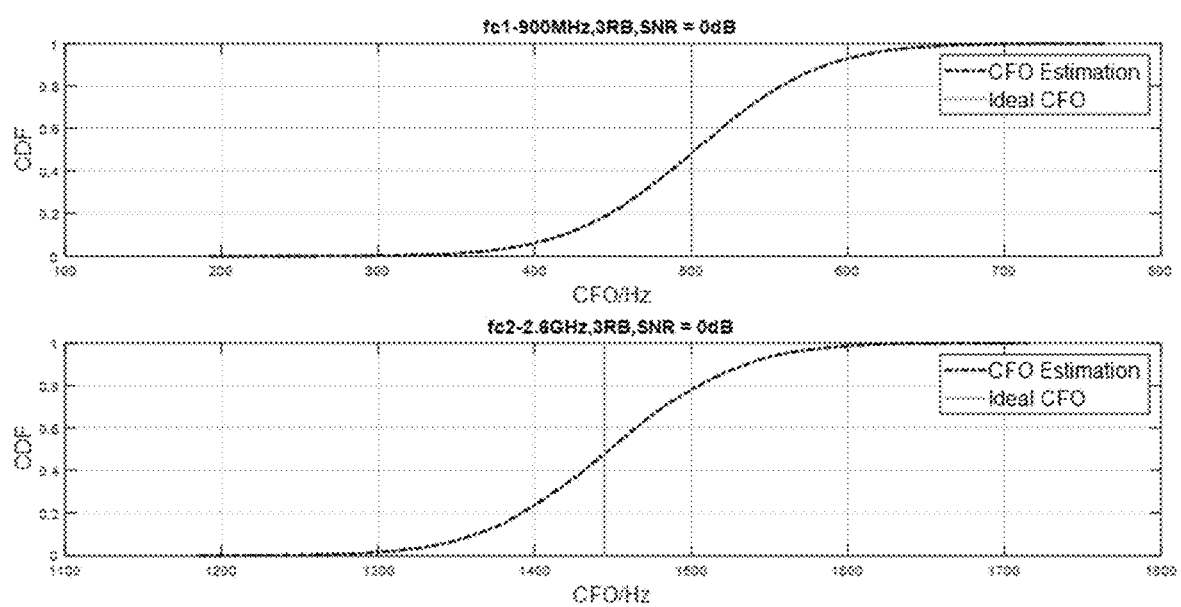
Figure 6B:
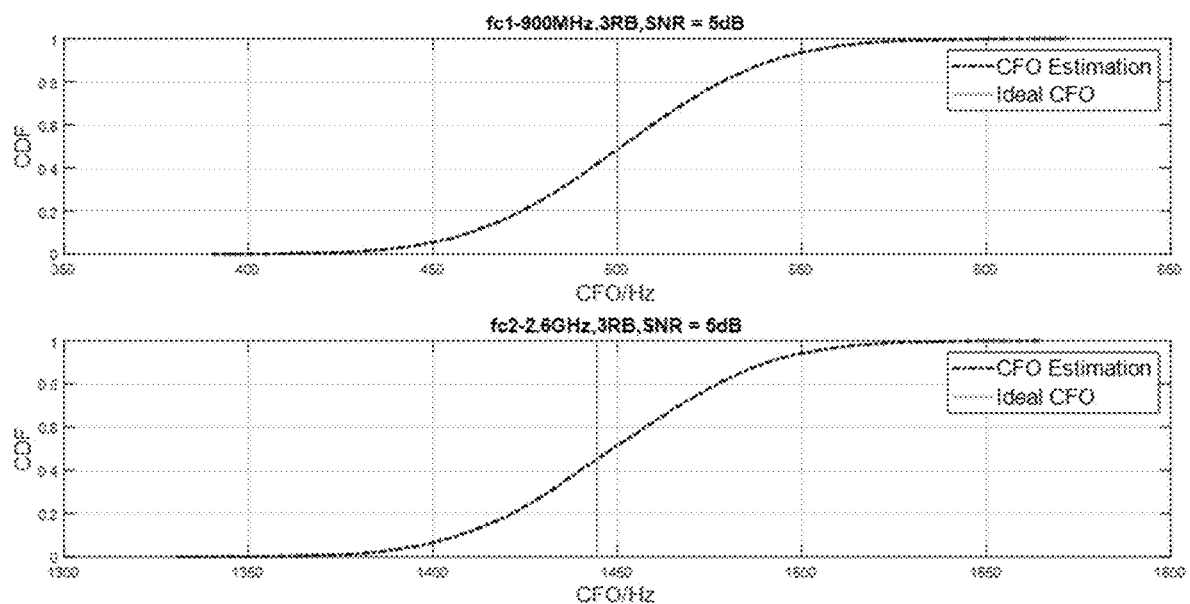
Figure 6C:
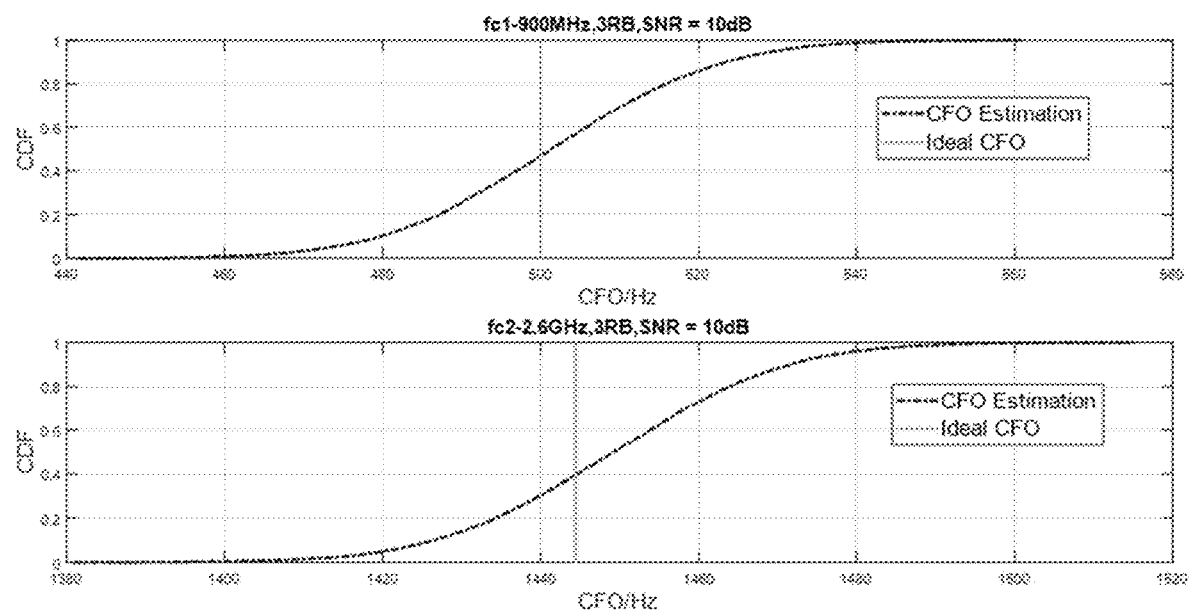

FIGS. 6A-6C illustrate a test result obtained by using 3RB for testing, and SNRs of FIGS. 6A-6C are 0 dB, 5 dB, and 10 dB in sequence.

It can be seen from FIGS. 4A-4C, 5A-5C, and 6A-6C that, in each simulation result, a difference between a carrier frequency-offset (i.e., CFO estimation) obtained according to the technical solution of the present disclosure and a true value of the frequency-offset (i.e., ideal CFO) is less than 1000 Hz. Therefore, the carrier frequency-offset obtained according to the technical solution of the present disclosure is accurate, and a frequency-offset interval can be accurately estimated.

On the other hand, it can be seen that, the obtained second carrier frequency-offset of the second carrier (2.6 GHz) is biased (that is, the distribution of an estimated value with respect to a true value is asymmetric). This is because a LS channel estimation value with a residual frequency-offset is used in fine frequency-offset estimation. When two demodulation reference signal (DMRS) pilot sequences are different, inter-carrier interference (ICI) will lead to bias of fine frequency-offset estimation. However, such bias is in a range of a dozen Hz, which is tolerable for a subcarrier spacing of 15 kHz. For the first carrier (900 MHz), bias of frequency-offset estimation is not obvious, this is because the frequency-offset of the first carrier is only less than half of that of 2.6 GHz. Therefore, the LS channel estimation value is less affected by the residual frequency-offset.

In summary, according to the method for carrier frequency-offset determination of the present disclosure, an accurate frequency-offset can be obtained, thereby ensuring reliability and accuracy of communication.

In addition, compared with a method for frequency-offset determination in the related art, the method of the present disclosure is simpler and of low complexity, thereby significantly saving computing resources and channel resources and improving resource utilization.

In addition, the present disclosure has no special requirements for pilot structure and has a wide application range. Compared with an existing receiver in CA scene, the overhead of a newly added module only involves multiplication for once and comparison of frequency-offsets, which is of low complexity and has engineering feasibility.

In addition, when single carrier frequency resources are limited, in the related art, a frequency-offset interval is estimated by configuring a pilot with a smaller interval (such as short-period SRS/PUCCH/PDCCH, or configuring DMRS with a smaller interval), which will occupy additional resources. Compared with related technologies, according to the present disclosure, a resource shortage problem can be alleviated. Through base-station scheduling, user equipment supporting CA adopts multi-carrier frequency transmission and adopts the technical solution of the present disclosure for frequency-offset determination, thereby saving resources on carrier frequencies.

Figure 7:
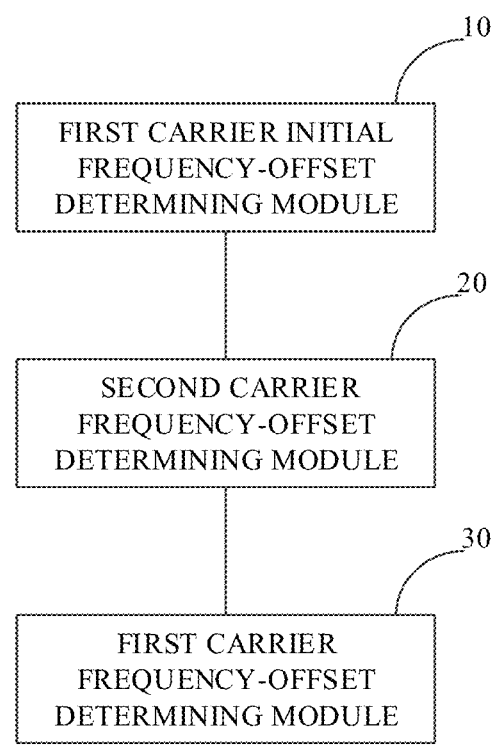
FIG. 7 is a block diagram illustrating an apparatus for carrier frequency-offset determination according to an implementation of the present disclosure.

Referring to FIG. 7, FIG. 7 is a block diagram illustrating an apparatus for carrier frequency-offset determination according to an implementation of the present disclosure.

As illustrated in FIG. 7, the apparatus includes a first carrier initial frequency-offset determining module 10, a second carrier frequency-offset determining module 20, and a first carrier frequency-offset determining module 30.

The first carrier initial frequency-offset determining module 10 is configured to obtain a first carrier initial frequency-offset according to a pilot time interval and a pilot phase difference of a first carrier.

The second carrier frequency-offset determining module 20 is connected to the first carrier initial frequency-offset determining module 10 and configured to obtain a second carrier frequency-offset according to a carrier frequency-ratio of a second carrier to the first carrier and the first carrier initial frequency-offset.

The first carrier frequency-offset determining module 30 is connected to the second carrier frequency-offset determining module 20 and configured to obtain a first carrier frequency-offset according to the first carrier initial frequency-offset.

In the present disclosure, the first carrier initial frequency-offset is obtained according to the pilot time interval and the pilot phase difference of the first carrier, the second carrier frequency-offset is obtained according to the carrier frequency-ratio of the second carrier to the first carrier and the first carrier initial frequency-offset, and the first carrier frequency-offset is obtained according to the first carrier initial frequency-offset. The method for carrier frequency-offset determination provided in the present disclosure is simple and efficient. Channel resources, computing resources, and overhead can be saved with this method. In addition, an accurate carrier frequency-offset can be quickly obtained while improving communication efficiency, thereby improving accuracy, reliability, and versatility of communication.

In a possible implementation, the second carrier frequency-offset is obtained according to the carrier frequency-ratio of the second carrier to the first carrier and the first carrier initial frequency-offset as follows. A product of the carrier frequency-ratio and the first carrier initial frequency-offset is assigned as the second carrier frequency-offset.

In a possible implementation, the second carrier frequency-offset is obtained according to the carrier frequency-ratio of the second carrier to the first carrier and the first carrier initial frequency-offset as follows. Multiple third frequency-offsets are obtained according to a pilot time interval and a pilot phase difference of the second carrier. One of the multiple third frequency-offsets is determined as the second carrier frequency-offset according to the carrier frequency-ratio.

In a possible implementation, the first carrier frequency-offset is obtained according to the first carrier initial frequency-offset as follows. The first carrier initial frequency-offset is assigned as the first carrier frequency-offset.

In a possible implementation, one of the multiple third frequency-offsets is determined as the second carrier frequency-offset according to the carrier frequency-ratio as follows. One of the multiple third frequency-offsets, which is closest to the product of the carrier frequency-ratio and the first carrier initial frequency-offset, is determined as the second carrier frequency-offset.

In a possible implementation, the first carrier initial frequency-offset includes multiple first carrier initial frequency-offsets, and the apparatus further performs the following operations.

Multiple frequency-offset ratios of the multiple third frequency-offsets to the multiple first carrier initial frequency-offsets are obtained. The second carrier frequency-offset is obtained according to the multiple frequency-offset ratios and the carrier frequency-ratio.

In a possible implementation, the second carrier frequency-offset is obtained according to the frequency-offset ratios and the carrier frequency-ratio as follows. A frequency-offset ratio closest to the carrier frequency-ratio is determined. A third frequency-offset, which corresponds to the frequency-offset ratio closest to the carrier frequency-ratio, is determined as the second carrier frequency-offset. The first carrier frequency-offset is obtained according to the first carrier initial frequency-offset as follows. A first carrier initial frequency-offset, which corresponds to the frequency-offset ratio closest to the carrier frequency-ratio, is assigned as the first carrier frequency-offset.

It should be noted that, the apparatus for carrier frequency-offset determination corresponds to the method for carrier frequency-offset determination. For specific introduction of the apparatus, reference can be made to previous descriptions of the method for carrier frequency-offset determination, which will not be repeated here.

Figure 8:
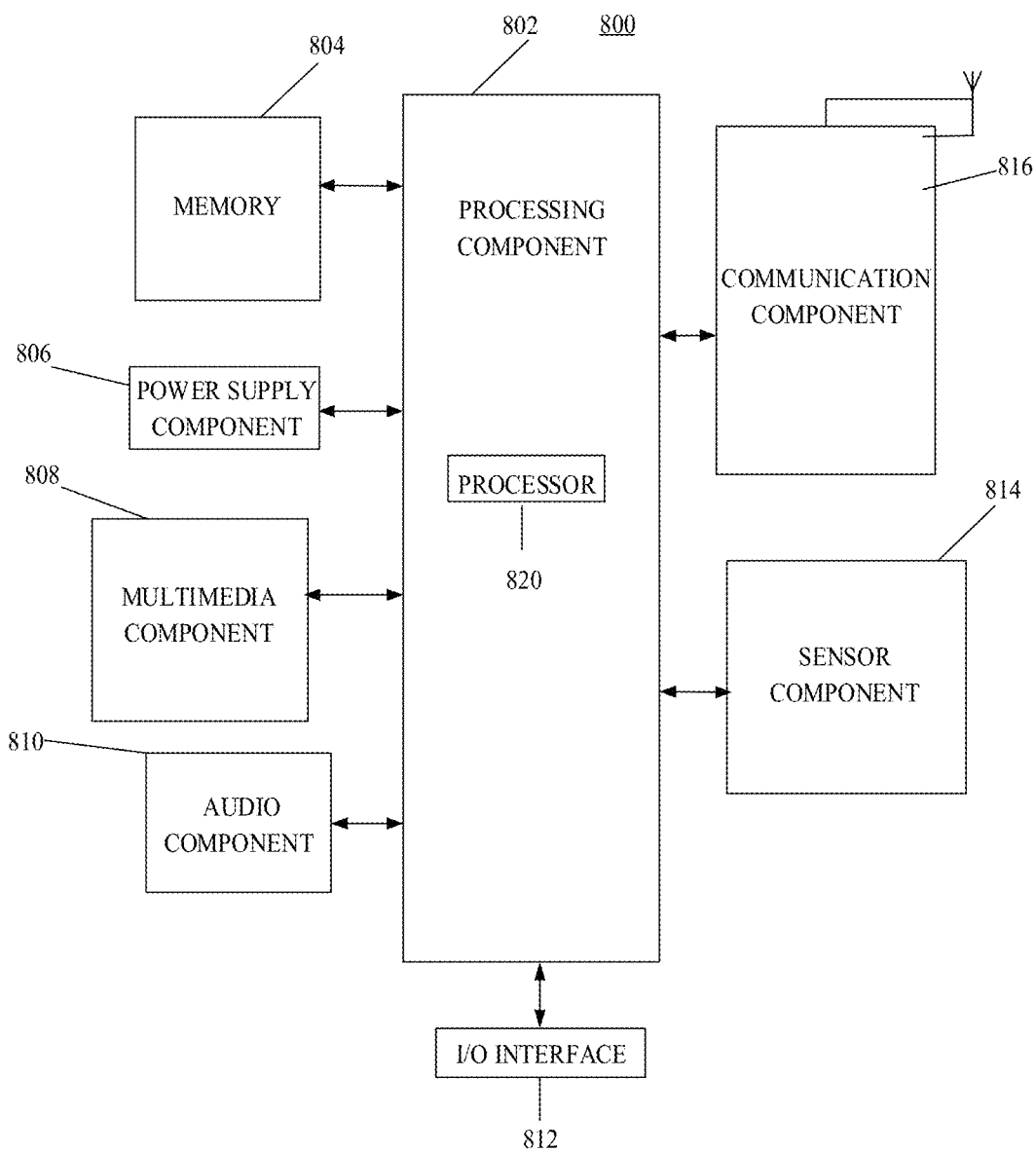
FIG. 8 is a block diagram illustrating an apparatus for carrier frequency-offset determination according to an implementation of the present disclosure.

Referring to FIG. 8, FIG. 8 is a block diagram illustrating an apparatus for carrier frequency-offset determination according to an implementation of the present disclosure.

For example, the apparatus 800 may be a mobile phone, a computer, a digital broadcast terminal, a messaging device, a game console, a tablet device, a medical device, exercise equipment, a personal digital assistant, etc.

With reference to FIG. 8, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operation of the apparatus 800, such as operations associated with display, phone calls, data communications, camera operations, and recording operations. The processing component 802 may include one or more processors 820 to execute instructions to implement all or some of the steps of the methods above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the apparatus 800. Examples of the data include instructions for any application or method operated on the apparatus 800, contact data, contact list data, messages, pictures, videos, and the like. The memory 804 may be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power supply component 806 provides power for various components of the apparatus 800. The power supply component 806 may include a power management system, one or more power supplies, and other components associated with power generation, management, and distribution for the apparatus 800.

The multimedia component 808 includes a screen between the apparatus 800 and a user that provides an output interface. In some embodiments, the screen may include a liquid crystal display (LCD) and a touch panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the apparatus 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the apparatus 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor assembly 814 includes one or more sensors for providing state assessment in various aspects for the apparatus 800. For example, the sensor component 814 may detect an on/off state of the apparatus 800, and relative positioning of components, which are for example the display and keypad of the apparatus 800, and the sensor assembly 814 may further detect a position change of the apparatus 800 or a component of the apparatus 800, the presence or absence of contact of the user with the apparatus 800, the orientation or acceleration/deceleration of the apparatus 800, and a temperature change of the apparatus 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the apparatus 800 and other devices. The apparatus 800 may access a wireless network based on a communication standard, such as WiFi, 2G, or 3G, or a combination thereof. In one exemplary embodiment, the communication component 816 receives a broadcast signal or broadcast-related information from an external broadcast management system by means of a broadcast channel. In one exemplary embodiment, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In exemplary embodiments, the apparatus 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements, to execute the method above.

In exemplary embodiments, a non-volatile computer readable storage medium is further provided, for example, a memory 804 including computer program instructions, which may be executed by the processor 820 of the apparatus 800 to implement the method above.

In exemplary embodiments, a computer program is further provided. When the computer program is executed by a processor, any method above is implemented. For example, the computer program may be executed by the processor 820 of the apparatus 800 to implement any method above.

The present disclosure may be a system, a method, and/or a computer program product. The computer program product may include a computer readable storage medium having computer readable program instructions thereon for enabling a processor to implement aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of the computer readable storage medium include: a portable computer diskette, a hard disk, a random access memory (RAM), an ROM, an EPROM (or a flash memory), a SRAM, a portable compact disk read-only memory (CD-ROM), a digital versatile disc (DVD), a memory stick, a floppy disk, a mechanically encoded device such as punch-cards or raised structure in a groove having instructions stored thereon, and any suitable combination thereof. A computer readable storage medium, as used herein, is not to be construed as being transitory signals per se, such as radio waves or other freely propagating electromagnetic waves, electromagnetic waves propagating by means of a waveguide or other transmission media (e.g., light pulses passing through a fiber-optic cable), or electrical signals transmitted by means of a wire.

Computer-readable program instructions described herein may be downloaded to respective computing/processing devices from the computer readable storage medium or to an external computer or external storage device by means of a network, for example, the Internet, a local area network (LAN), a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer readable program instructions may be executed completely on a user computer, executed partially on the user computer, executed as an independent software package, executed partially on the user computer and partially on a remote computer, or executed completely on the remote computer or server. In a scenario involving the remote computer, the remote computer may be connected to the user computer by means of any type of network, including a LAN or a wide area network (WAN), or the connection may be made to an external computer (for example, connecting by using an Internet service provider by means of the Internet). In some embodiments, electronic circuitry including, for example, programmable logic circuitry, the FGPAs, or programmable logic arrays (PLAs) may execute the computer readable program instructions by utilizing state information of the computer readable program instructions to personalize the electronic circuitry, so as to implement the aspects of the present disclosure.

The aspects of the present disclosure are described herein with reference to flowcharts and/or block diagrams of methods, apparatuses (systems), and computer program products according to the embodiments of the present disclosure. It should be understood that, each block of the flowcharts and/or block diagrams, and combinations of the blocks in the flowcharts and/or block diagrams may be implemented by the computer readable program instructions.

These computer readable program instructions may be provided to a processor of a general-purpose computer, special-purpose computer, or other programmable data processing apparatus to produce a machine, such that the instructions, which execute by means of the processor of the computer or other programmable data processing apparatuses, create means for executing the functions/actions specified in one or more blocks of the flowcharts and/or block diagrams. These computer readable program instructions may also be stored in the computer readable storage medium, the instructions enable the computer, the programmable data processing apparatus, and/or other devices to function in a particular manner, so that the computer readable medium having instructions stored therein includes an article of manufacture including instructions which implement the aspects of the functions/actions specified in one or more blocks of the flowcharts and/or block diagrams.

The computer readable program instructions may also be loaded onto a computer, other programmable data processing apparatuses, or other devices to cause a series of operational steps to be performed on the computer, other programmable apparatuses or other devices to produce a computer implemented process, so that the instructions which execute on the computer, other programmable apparatuses or other devices implement the functions/actions specified in one or more blocks of the flowcharts and/or block diagrams.

The flowcharts and block diagrams in the accompanying drawings illustrate the architecture, functionality, and operations of possible implementations of systems, methods, and computer program products according to multiple embodiments of the present disclosure. In this regard, each block in the flowchart or block diagram may represent a module, program segment, or portion of instruction, which includes one or more executable instructions for executing the specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, may be implemented by special purpose hardware-based systems that perform the specified functions or actions or implemented by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

What is claimed is:

1. A method for carrier frequency-offset determination, comprising:
    obtaining a first carrier initial frequency-offset according to a pilot time interval and a pilot phase difference of a first carrier;
    obtaining a second carrier frequency-offset according to a carrier frequency-ratio of a second carrier to the first carrier and the first carrier initial frequency-offset; and
    obtaining a first carrier frequency-offset according to the first carrier initial frequency-offset.

2. The method of claim 1, wherein obtaining the second carrier frequency-offset according to the carrier frequency-ratio of the second carrier to the first carrier and the first carrier initial frequency-offset comprises:
    assigning a product of the carrier frequency-ratio and the first carrier initial frequency-offset as the second carrier frequency-offset.

3. The method of claim 1, wherein obtaining the second carrier frequency-offset according to the carrier frequency-ratio of the second carrier to the first carrier and the first carrier initial frequency-offset comprises:
    obtaining a plurality of third frequency-offsets according to a pilot time interval and a pilot phase difference of the second carrier; and
    determining one of the plurality of third frequency-offsets as the second carrier frequency-offset according to the carrier frequency-ratio.

4. The method of claim 3, wherein obtaining the first carrier frequency-offset according to the first carrier initial frequency-offset comprises:
    assigning the first carrier initial frequency-offset as the first carrier frequency-offset.

5. The method of claim 4, wherein determining one of the plurality of third frequency-offsets as the second carrier frequency-offset according to the carrier frequency-ratio comprises:

determining one of the plurality of third frequency-offsets, which is closest to the product of the carrier frequency-ratio and the first carrier initial frequency-offset, as the second carrier frequency-offset.

6. The method of claim 3, wherein the first carrier initial frequency-offset comprises a plurality of first carrier initial frequency-offsets, and the method further comprises:

obtaining a plurality of frequency-offset ratios of the plurality of third frequency-offsets to the plurality of first carrier initial frequency-offsets; and obtaining the second carrier frequency-offset according to the plurality of frequency-offset ratios and the carrier frequency-ratio.

7. The method of claim 6, wherein
obtaining the second carrier frequency-offset according to the frequency-offset ratios and the carrier frequency-ratio comprises:

determining a frequency-offset ratio closest to the carrier frequency-ratio; and determining a third frequency-offset, which corresponds to the frequency-offset ratio closest to the carrier frequency-ratio, as the second carrier frequency-offset; and obtaining the first carrier frequency-offset according to the first carrier initial frequency-offset comprises:

assigning a first carrier initial frequency-offset, which corresponds to the frequency-offset ratio closest to the carrier frequency-ratio, as the first carrier frequency-offset.

8. An apparatus for carrier frequency-offset determination, comprising:

a memory configured to store processor executable instructions; and a processor configured to:
obtain a first carrier initial frequency-offset according to a pilot time interval and a pilot phase difference of a first carrier;

obtain a second carrier frequency-offset according to a carrier frequency-ratio of a second carrier to the first carrier and the first carrier initial frequency-offset; and obtain a first carrier frequency-offset according to the first carrier initial frequency-offset.

9. The apparatus of claim 8, wherein the processor configured to obtain the second carrier frequency-offset according to the carrier frequency-ratio of the second carrier to the first carrier and the first carrier initial frequency-offset is configured to:

assign a product of the carrier frequency-ratio and the first carrier initial frequency-offset as the second carrier frequency-offset.

10. The apparatus of claim 8, wherein the processor configured to obtain the second carrier frequency-offset according to the carrier frequency-ratio of the second carrier to the first carrier and the first carrier initial frequency-offset is configured to:

obtain a plurality of third frequency-offsets according to a pilot time interval and a pilot phase difference of the second carrier; and determine one of the plurality of third frequency-offsets as the second carrier frequency-offset according to the carrier frequency-ratio.

11. The apparatus of claim 10, wherein the processor configured to obtain the first carrier frequency-offset according to the first carrier initial frequency-offset is configured to:

assign the first carrier initial frequency-offset as the first carrier frequency-offset.

12. The apparatus of claim 11, wherein the processor configured to determine one of the plurality of third frequency-offsets as the second carrier frequency-offset according to the carrier frequency-ratio is configured to:

determine one of the plurality of third frequency-offsets, which is closest to the product of the carrier frequency-ratio and the first carrier initial frequency-offset, as the second carrier frequency-offset.

13. The apparatus of claim 10, wherein the first carrier initial frequency-offset comprises a plurality of first carrier initial frequency-offsets, and the processor is further configured to:

obtain a plurality of frequency-offset ratios of the plurality of third frequency-offsets to the plurality of first carrier initial frequency-offsets; and obtain the second carrier frequency-offset according to the plurality of frequency-offset ratios and the carrier frequency-ratio.

14. The apparatus of claim 13, wherein
the processor configured to obtain the second carrier frequency-offset according to the frequency-offset ratios and the carrier frequency-ratio is configured to:

determine a frequency-offset ratio closest to the carrier frequency-ratio; and determine a third frequency-offset, which corresponds to the frequency-offset ratio closest to the carrier frequency-ratio, as the second carrier frequency-offset; and the processor configured to obtain the first carrier frequency-offset according to the first carrier initial frequency-offset is configured to:

assign a first carrier initial frequency-offset, which corresponds to the frequency-offset ratio closest to the carrier frequency-ratio, as the first carrier frequency-offset.

15. A non-volatile computer-readable storage medium storing computer program instructions, wherein the computer program instructions are operable with a processor to:

obtain a first carrier initial frequency-offset according to a pilot time interval and a pilot phase difference of a first carrier;

obtain a second carrier frequency-offset according to a carrier frequency-ratio of a second carrier to the first carrier and the first carrier initial frequency-offset; and obtain a first carrier frequency-offset according to the first carrier initial frequency-offset.

16. The non-volatile computer-readable storage medium of claim 15, wherein the computer program instructions operable with the processor to obtain the second carrier frequency-offset according to the carrier frequency-ratio of the second carrier to the first carrier and the first carrier initial frequency-offset are operable with the processor to:

assign a product of the carrier frequency-ratio and the first carrier initial frequency-offset as the second carrier frequency-offset.

17. The non-volatile computer-readable storage medium of claim 15, wherein the computer program instructions operable with the processor to obtain the second carrier frequency-offset according to the carrier frequency-ratio of the second carrier to the first carrier and the first carrier initial frequency-offset are operable with the processor to:

obtain a plurality of third frequency-offsets according to a pilot time interval and a pilot phase difference of the second carrier; and determine one of the plurality of third frequency-offsets as the second carrier frequency-offset according to the carrier frequency-ratio.

18. The non-volatile computer-readable storage medium of claim 17, wherein the computer program instructions operable with the processor to obtain the first carrier frequency-offset according to the first carrier initial frequency-offset are operable with the processor to:

assign the first carrier initial frequency-offset as the first carrier frequency-offset.

19. The non-volatile computer-readable storage medium of claim 18, wherein the computer program instructions operable with the processor to determine one of the plurality of third frequency-offsets as the second carrier frequency-offset according to the carrier frequency-ratio are operable with the processor to:

determine one of the plurality of third frequency-offsets, which is closest to the product of the carrier frequency-ratio and the first carrier initial frequency-offset, as the second carrier frequency-offset.

20. The non-volatile computer-readable storage medium of claim 17, wherein the first carrier initial frequency-offset comprises a plurality of first carrier initial frequency-offsets, and the computer program instructions are further operable with the processor to:

obtain a plurality of frequency-offset ratios of the plurality of third frequency-offsets to the plurality of first carrier initial frequency-offsets; and obtain the second carrier frequency-offset according to the plurality of frequency-offset ratios and the carrier frequency-ratio.

* * * * *